Patented Dec. 1, 1942

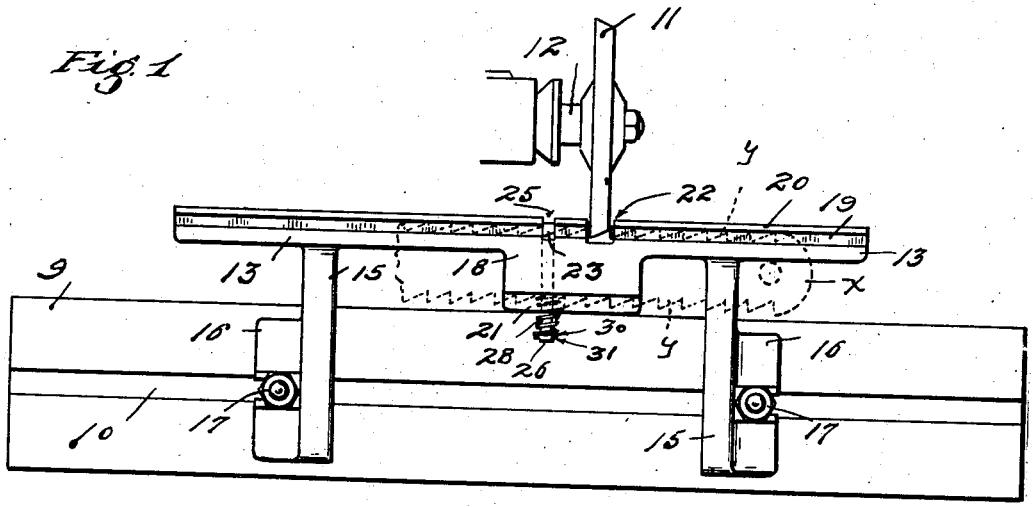
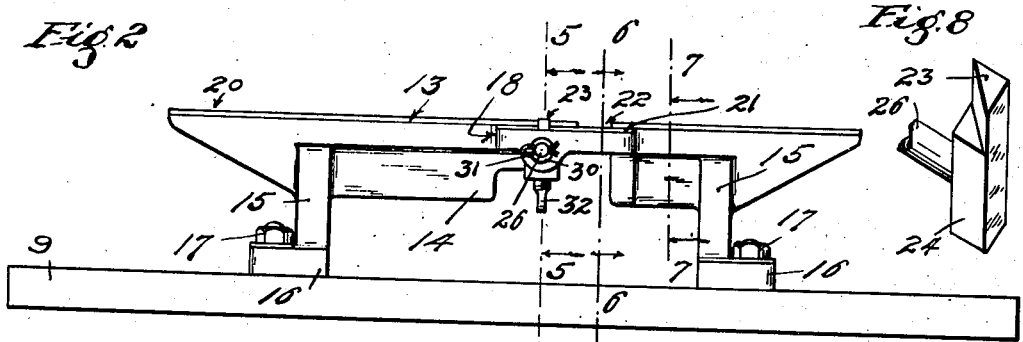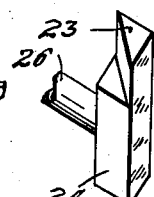
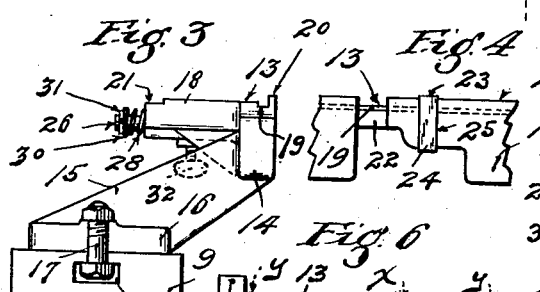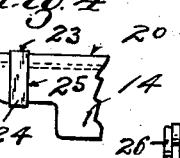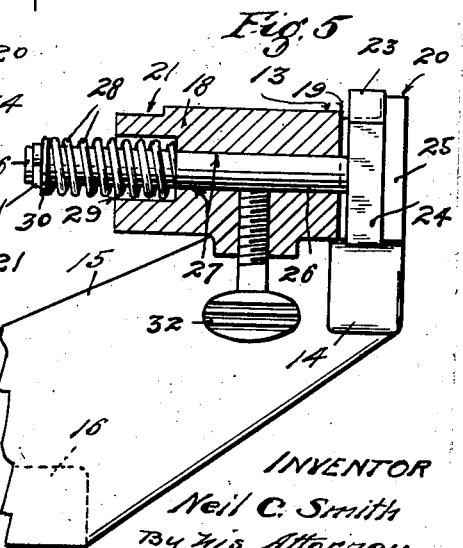
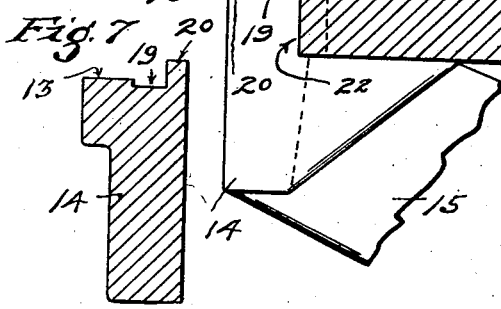

2,303,896

UNITED STATES PATENT OFFICE 2,303,896

HACK SAW GRINDING FIXTURE

Neil C. Smith, Minneapolis, Minn.

Application May 19, 1941, Serial No. 394,138

5 Claims. (Cl. 76—74)

My invention relates to improvements in hack saw grinding fixtures and more particularly to a grinding fixture for holding a high speed power hack saw blade while the teeth thereof are being sharpened by a grinding wheel.

The main object of this invention is to provide a grinding fixture in which the set of the teeth on the blade of the hack saw is compensated for and thereby permits the saw blade to lie perfectly flat on the table of the grinding fixture so that the grinding wheel contacts the teeth on a blade at right angles to the plane of said blade, whereby the blade will cut perfectly straight after grinding and not at an angle.

A further object of this invention is to provide a grinding fixture in which the set of the teeth on a double edged blade is compensated for.

Another object of this invention is to provide a grinding fixture having a table on which a long hack saw blade is adequately supported while being ground so that bending or bowing of the blade by "overhang" beyond the ends of the table is prevented.

Other objects of the invention will be apparent from the following description, reference being had to the accompanying drawing.

Grinding fixtures for hack saw blades heretofore provided made it necessary to rest the teeth of a blade on the table of the fixture, while being ground, and hence the set in the teeth held the blade transversely oblique to the plane of the top of the table or in other words transversely tilted the blade on the table. This type of grinding fixture is highly objectional for the reason that the grinding of the teeth left the points thereof transversely oblique to the plane of the blade with the result that a ground blade would cut at an angle instead of straight.

To the above end the invention consists of the novel construction and arrangements of parts, hereinafter described and defined in the claims.

In the accompanying drawing, which illustrates the invention, like characters indicate like parts throughout the several views.

Referring to the drawing:

Fig. 1 is a plan view of the improved hack saw grinding fixture mounted on the table of a universal tool grinder, some parts of said grinder being only fragmentarily illustrated, and also fragmentarily showing, by means of broken lines, a hack saw blade having teeth on each of its longitudinal edges;

Fig. 2 is a front elevation of certain of the parts shown in Fig. 1;

Fig. 3 is a right hand end elevation of the parts shown in Fig. 2;

Fig. 4 is a fragmentary rear elevation of the intermediate portion of the parts shown in Fig. 2;

Fig. 5 is a fragmentary view partly in end elevation and partly in section taken on the line 5—5 of Fig. 2, on an enlarged scale;

Fig. 6 is a view partly in end elevation and partly in section taken on the line 6—6 of Fig. 2, on an enlarged scale;

Fig. 7 is a detail view in section taken on the line 7—7 of Fig. 2, on an enlarged scale; and Fig. 8 is a fragmentary perspective view of the detent.

The improved hack saw grinding fixture, as shown, is mounted on a commercial universal tool grinder, fragmentarily illustrated, and of the parts thereof, it is important to note the table 9, having a longitudinal T-groove 10, and the grinding wheel 11 and its spindle 12. It is well known that the grinding wheel 10 is mounted for vertical, horizontal and angular turning movements relative to the table 9, but for the purpose of this case it is not thought necessary to illustrate the same.

Referring now in detail to the improved grinding fixture the numeral 13 indicates a relatively long and narrow table on a frame 14 including a pair of laterally spaced, forwardly and downwardly inclined legs 15. These legs 15 have outturned feet 16 that rest on the table 13. As shown the table 13, frame 14, legs 15 and feet 16 are al formed by a single casting. The feet 16 are bifurcated to receive nut-equipped bolts 17 held in the T-groove 10 and which bolts rigidly but detachably and adjustably secure the improved hack saw fixture to the universal tool grinder.

By reference to Fig. 1 it will be noted that the table 13, at its intermediate portion, is materially widened by extending the same forwardly, as indicated at 18. Formed in the table 13, close to the inner or rear longitudinal edge thereof, is a groove 19 that extends parallel thereto. This groove 19 extends the full length of the table 13 and completely through the ends thereof, so that the ends of said groove are open. The purpose of this groove 19 is to receive the teeth of a hack saw blade while it is being ground so that they are entirely out of contact with the grinding fixture and thereby permits said blade to lie flat on the table 13 and its extension 18 while its teeth are being ground.

The narrow strip of the table 13 lying between its rear longitudinal edge and the groove 19, is extended above the top of the table 13 to afford a stop flange 20 against the inner face of which the points of the teeth of a hack saw blade are pressed during the grinding of said teeth. This stop flange 20 always positions a hack saw blade at the correct angle to the plane of the grinding wheel 11 and also insures the grinding of the teeth to a constant depth. Formed in the outer longitudinal edge portion of the table extension 18 is a rabbet or groove 21, that extends the full length of said extension. The purpose of the rabbet 21 is, together with the groove 19, to receive the teeth of a double edged hack saw blade and thereby permit said blade to lie flat on the table 13 and its extension 18.

Formed in the table 13, rearwardly of its extension 18, is a transverse, vertical passageway 22 in which the grinding wheel 11 works with clearance. This passageway 22 extends from the rear longitudinal edge of the table 13 completely through the groove 19 and into said table on the inner side of said groove.

A detent 23, having a depending body 24 that is square in cross-section, is mounted in a way 25 in the table 13 to the left of the passageway 22. This way 25 is parallel to the passageway 22 and extends from the rear longitudinal edge of the table 13, completely through the groove 19 and slightly into said table on the front side of said groove. The detent 23 and its body 24 are held in the way 25 in upright positions for straight line sliding movement transversely of the table 13. A round stem 26 is rigidly secured to the detent body 24, at its longitudinal center, and extends horizontally through a bore-like seat 27 therefor in the table 13 and its extension 18. This stem 26 extends forwardly and transversely of the table 13 and supports the detent 23 and its body 24 with freedom for movement in the way 25. A coiled spring 28 encircling the outer end portion the stem 26, extends into an enlargement of the outer end portion of the seat 27, as indicated at 29. This spring 28 is compressed between the table 13 extension 18 and a washer 30 on the other end of said stem and is held in place by a cotter pin 31. The spring 28 is under strain to draw the detent 23 toward the inner end of the way 25. A lock screw 32 is provided for holding the detent 23 in different adjustments in the way 25. This lock screw 32 has threaded engagement with the frame 14 and arranged to impinge against the stem 26.

A hack saw blade X having teeth Y on each of its longitudinal edges is fragmentarily shown in Fig. 1. It will be noted that one row of the teeth Y, while being ground, lies in the groove 19 and that the other row of said teeth lies in the rabbet 21 thus permitting the blade X to lie flat on the table 13 and its extension 18. The periphery of the grinding wheel 11, is transversely beveled to grind the backs of the teeth Y at the desired angle and the left hand side of the grinding wheel 11 grinds the faces of said teeth. These two grinding operations on each tooth Y form a sharp point thereon and this point is at a right angle to the plane of the blade X, due to the fact that the groove 19, and also the rabbet 21 when a hack saw having a double cutting edge is being ground in my improved fixture, permits or permit the hack saw blade to lie flat on the table 13. As heretofor stated it is highly important, for the correct grinding of a hack saw blade, that the points of the teeth are absolutely at right angles to the plane of the saw blade.

The depth to which the gullets in a hack saw blade are ground may be varied by adjusting the grinding wheel 11 in the passageway 22 toward or from the hack saw blade on the table 13. The detent 23, in cross-section, fits in the gullet between two of the teeth Y and endwise positions the hack saw blade X so that the grinding wheel 11 works, as shown, in the second gullet from said detent and grinds the face of one of the respective teeth Y and the back of the other thereof. It will thus be seen that the detent 23 correctly endwise positions the hack saw blade X relative to the grinding wheel 11 so that its teeth when ground, are accurately spaced longitudinally of the blade.

To grind a hack saw blade, the same is laid flatwise on the table 13 with its teeth in the groove 19, and if it is a double-edged blade, its other teeth will lie in the rabbet 21. The first two or three teeth on a blade will have to be ground without the use of the detent 23. The detent 23 may be adjusted in the gullet between two of the ground teeth, when the points of said teeth are in engagement with the stop flange 20, and then locked in its adjusted position by the screw 32.

When grinding a hack saw blade, the same is pressed by hand flatwise on the table 13 and its extension 18 and then feeds by hand edgewise to the detent 23 and grinding wheel 11. The detent 23, upon entering one of the gullets in the cutting edge of a hack saw blade, will, due to its novel shape, accurately endwise position said blade relative to the grinding wheel 11 so that the teeth, as they are successively ground, are all exactly the same distance apart. A hack saw blade to be ground is fed by hand edgewise to the grinding wheel 11 and at the same time firmly pressed on the table 13 until stopped by the engagement of the points of its teeth with the stop flange 20. This stop flange 20 insures the grinding of a hack saw blade with the gullets therein all of a constant depth. During each grinding operation, the grinding wheel 11 grinds the oblique back of one of the teeth in a blade and the perpendicular face of the next following tooth, thus forming a sharp point on each tooth that is exactly at a right angle to the plane of said blade.

The grinding wheel 11, when moving downward in a gullet between two of the teeth on the hack saw blade, and which blade is adequately supported on the table 13, materially assists in holding said blade on the table 13. As the operations in feeding a hack saw blade edgewise to and from the grinding wheel 11 and in moving the blade edgewise to successively bring the teeth in position to be ground, are entirely manual, a hack saw blade may be very quickly and easily ground and at the same time accurately ground.

The above described hack saw blade grinding fixture, while extremely simple and of relatively small cost to manufacture, can be very quickly applied to a universal tool grinder and is being successfully used in some of the large shops in the country.

The word "chamfer" is herein used in a broad sense to cover a groove, a rabbet or any other clearance in the top of a table to compensate for the set in the teeth of a saw whereby the saw blade will lie flat on the table.

What I claim is:

1. In a fixture of the kind described, a table having a flat upper surface, a stop flange on the table at one of its longitudinal edges, said table at the inner face of the stop flange being chamfered to afford clearance for the teeth of a hack saw blade loosely resting flatwise on the table with the points of the teeth approximately engaging the stop flange, and a pasageway in the table for a grinding wheel held against bodily movement in the plane thereof, said passageway extending transversely through the stop flange and into the respective edge portion of the table, whereby a hack saw blade loosely resting on the table may be moved by hand in the plane thereof, both lonigtudinally and transversely of the table to successively bring its teeth into said passageway and said blade pressed by hand onto the table and fed to the grinding wheel until stopped by the engagement of the points of the teeth with the stop flange.

2. The structure defined in claim 1 in which the other longitudinal edge portion of the table is chamfered to afford clearance for the other teeth of a double-edged saw.

3. The structure defined in claim 1 further including a yieldingly held detent mounted on the table for movement transversely thereof, said detent being constructed and arranged to enter one of the gullets in the toothed edge of the saw blade and align a second gullet therein with the grinding wheel and hold the saw blade against endwise movement.

4. In a fixture of the kind described, a long narrow table having a relatively short intermediate offset extension at one of its longitudinal edges that materially increases the intermediate width of the table, the upper surface of the table and its extension being flat, a stop flange on the table at its other longitudinal edge, said table at the inner face of the stop flange being chamfered to afford clearance for the teeth of a hack saw blade loosely resting on the table with the points of the teeth approximately engaging the stop flange, and a passageway in the table for a grinding wheel and extending transversely through the stop flange and into the chamfer, whereby a hack saw blade loosely resting on the table and its extension may be moved by hand in the plane of said blade to successively bring its teeth into said passageway and be pressed by hand onto the table during the grinding thereof.

5. The structure defined in claim 4 in which the outer longitudinal edge portion of the table extension is chamfered to afford clearance for the other teeth of a double-edged saw.

NEIL C. SMITH.